(12) United States Patent
Suanno (10) Patent No.: US 12,195,114 B2
(45) Date of Patent: Jan. 14, 2025

(54) UNDERCARRIAGE TRACK ROLLER HAVING ASYMMETRIC SHELL WITH OIL GROOVES AND ROLLER SHAFT FOR SAME

(71) Applicant: Caterpillar Inc., Peoria, IL (US)

(72) Inventor: Gennaro Suanno, Modena (IT)

(73) Assignee: Caterpillar Inc., Peoria, IL (US)

( * ) Notice: Subject to any disclaimer, the term of this patent is extended or adjusted under 35 U.S.C. 154(b) by 791 days.

(21) Appl. No.: 17/308,445

(22) Filed: May 5, 2021

(65) Prior Publication Data

US 2022/0355874 A1 Nov. 10, 2022

(51) Int. Cl.
 *B62D 55/15* (2006.01)
 *B62D 55/088* (2006.01)
 *B62D 55/092* (2006.01)

(52) U.S. Cl.
 CPC ........... *B62D 55/15* (2013.01); *B62D 55/088* (2013.01); *B62D 55/092* (2013.01)

(58) Field of Classification Search
 CPC ....... B62D 55/14; B62D 55/15; B62D 55/092
 See application file for complete search history.

(56) References Cited

U.S. PATENT DOCUMENTS

| 2,351,909 A | 6/1944 | Beretish |
| 2,926,968 A | 3/1960 | Toth |
| 6,364,438 B1 | 4/2002 | Hasselbusch et al. |
| 6,481,807 B1 | 11/2002 | Barani et al. |
| 6,874,859 B1 | 4/2005 | Duse |
| 7,108,337 B2 | 9/2006 | Yamamoto et al. |
| 9,745,005 B2 * | 8/2017 | Johannsen ........... B62D 55/088 |
| 9,840,291 B2 | 12/2017 | Kita |
| 10,086,889 B2 | 10/2018 | Kita |
| 11,235,822 B2 * | 2/2022 | Nagaoka ................ B62D 55/14 |
| 2002/0153773 A1 * | 10/2002 | Yoon ...................... B62D 55/15 305/136 |

FOREIGN PATENT DOCUMENTS

| CN | 210912659 U | 7/2020 |
| CN | 211969615 U | 11/2020 |
| EP | 1088748 | 4/2001 |
| EP | 1259416 | 11/2002 |
| JP | 2010269697 | 12/2010 |
| JP | 2020179782 A | 11/2020 |
| WO | 2018138647 A3 | 8/2018 |
| WO | 2020217993 A1 | 10/2020 |

* cited by examiner

*Primary Examiner* — Jason R Bellinger (57) ABSTRACT

A track roller for an undercarriage system includes a roller shell with a first inner surface forming a larger diameter shaft bore and a second inner surface forming a smaller diameter shaft bore coaxially arranged with the larger diameter shaft bore. A roller shaft having a first shaft end and a second shaft end supports the roller shell for rotation and has an oil reservoir formed therein. A first sleeve bearing and a second sleeve bearing are positioned upon the roller shaft, and an axially extending oil passage is formed by the second inner surface of the roller shell forming the smaller diameter shaft bore and an outer bearing surface of the second sleeve bearing. The oil reservoir in the roller shaft is confined in its extent to the second shaft end of the roller shaft.

20 Claims, 5 Drawing Sheets

UNDERCARRIAGE TRACK ROLLER HAVING ASYMMETRIC SHELL WITH OIL GROOVES AND ROLLER SHAFT FOR SAME

TECHNICAL FIELD

The present disclosure relates generally to a track roller for an undercarriage system, and more particularly to an asymmetric roller shell and roller shaft structured for lubricating oil supply and circulation.

BACKGROUND

Track-type machines are used throughout the world in a variety of off-highway environments, including for applications such as mining, construction, forestry, road building, at landfills, and many others. A typical track-type machine includes a ground-engaging track positioned at each side of a machine frame. The ground-engaging track extends about a plurality of rotatable track-contacting elements including one or more idlers, a drive sprocket, and track rollers. The ground-engaging tracks can be advanced in a first direction to move the track-type machine forward, in a reverse direction to move the track-type machine back, and at differing speeds to change a travel direction or orientation of the track-type machine.

Track-type machines tend to be quite heavy both as a necessity for certain working applications and also because the large and complex parts of the machinery are generally built to be quite robust and heavy duty. The operating conditions experienced by track-type machines can also be quite rugged, pushing heavy loads, traveling over steep terrain, and interacting with coarse and abrasive substrate materials. The track rollers typically carry much of the weight of the track-type machine and rotate continuously as the track-type machine travels. For this reason, track rollers are typically constructed to withstand a range of types of loading that can be severe in magnitude, repetitive, and variable depending upon how and where the track-type machine is used. Engineers have developed a variety of lubrication strategies for track rollers in an effort to optimize field performance and service life.

In one common track roller design, metal face seals are used to provide a rotating but fluidly sealed interface between track rollers and a supporting roller shaft. Face seals and associated assemblies have been used for many years with great success. A reservoir of lubricating oil is commonly located in the roller shaft. Distributing and circulating lubricating oil, particularly in certain track roller designs, can be challenging. Efforts to accommodate various sealing and lubrication strategies can complicate the engineering and design of the overall track roller. One known track roller assembly configuration is set forth in U.S. Pat. No. 6,364,438 to Hasselbusch et al. In Hasselbusch et al., a roller assembly has a roller rim and a roller shaft. A retainer is press-fit into an access opening in the roller rim. An axial thrust bearing is interposed an outwardly extending flange of the roller shaft and a retainer.

SUMMARY OF THE INVENTION

In one aspect, a track roller for an undercarriage system includes a roller shell having an outer tread surface extending circumferentially around a roller axis of rotation, a first inner surface forming a larger diameter shaft bore, and a second inner surface forming a smaller diameter shaft bore coaxially arranged with the larger diameter shaft bore. The track roller further includes a roller shaft having a first shaft end positioned within the larger diameter shaft bore, and a second shaft end positioned within the smaller diameter shaft bore. The track roller further includes a bushing positioned within the larger diameter shaft bore, and a first sleeve bearing rotatable about the first shaft end and positioned within the bushing. The track roller still further includes a second sleeve bearing rotatable about the second shaft end and positioned within the roller shell, the second sleeve bearing including an inner bearing surface and an outer bearing surface. An axially extending oil passage is formed by the second inner surface of the roller shell and the outer bearing surface of the second sleeve bearing.

In another aspect, a roller for an undercarriage system includes a roller shell having a first radially projecting flange, a first outer tread surface adjacent to the first radially projecting flange and extending circumferentially around a roller axis of rotation, and a first inner surface forming a larger diameter shaft bore. The roller shell further includes a second radially projecting flange, a second outer tread surface adjacent to the second radially projecting flange and extending circumferentially around the roller axis of rotation, and a second inner surface forming a smaller diameter shaft bore coaxially arranged with the larger diameter shaft bore. The roller shell still further includes an inside thrust surface and an outside seal recess having a stepped-in profile. The smaller diameter bore extends between the inside thrust surface and the outside seal recess, and a plurality of oil grooves are each formed in the second inner surface and extend from the inside thrust surface to the seal recess.

In still another aspect, a roller shaft for a track roller in an undercarriage system includes an elongate shaft body defining a longitudinal axis and including a first shaft end having a first axial end surface and a first planar roller mounting surface extending inwardly from the first axial end surface, a second shaft end having a second axial end surface and a second planar roller mounting surface extending inwardly from the second axial end surface, and a thrust flange between the first shaft end and the second shaft end. The roller shaft further includes a first shaft end having a first seal carrier surface adjacent to the first planar roller mounting surface, and a first inboard surface extending between the thrust flange and the first seal carrier surface. The roller shaft still further includes a second shaft end having a second seal carrier surface adjacent to the second planar roller mounting surface, and a second inboard surface extending between the thrust flange and the second seal carrier surface. An oil reservoir is formed in the elongate shaft body and confined in its extent to the second shaft end.

DETAILED DESCRIPTION

Figure 1:
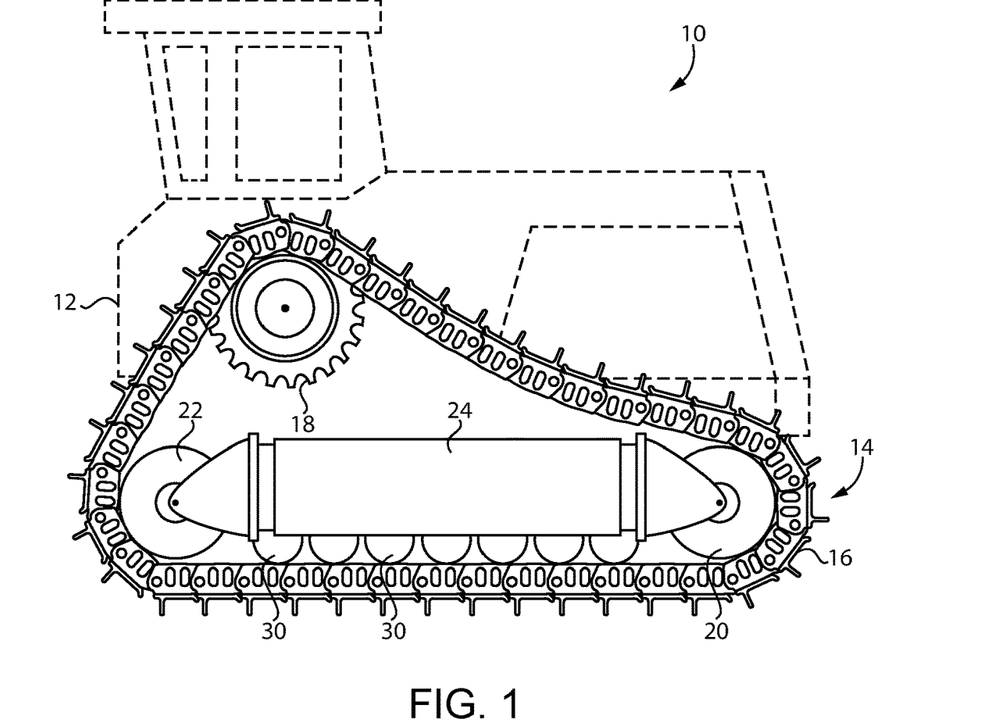
FIG. 1 is a side diagrammatic view of a machine, according to one embodiment.

Referring to FIG. 1, there is shown a machine 10 according to one embodiment and including a frame 12 supported upon a ground-engaging track system or undercarriage system 14. Undercarriage system 14 includes a track 16, typically one of two substantially identical tracks at opposite sides of frame 12, forming an endless loop of coupled track links (not numbered) extending about a drive sprocket 18, a front idler 20, and a back idler 22. Track pins couple together the track link, and track shoes are attached in a generally conventional manner. Undercarriage system 14 further includes a track roller frame 24, and a plurality of track rollers 30 coupled to track roller frame 24 and supporting a majority of a weight of machine 10. Machine 10 is shown in the context of a track-type tractor, but could alternatively be a track-type loader, an excavator, a front shovel, a half-track machine, or a variety of other types of equipment. Undercarriage system 14 is shown with track 16 in a so-called high drive configuration. In other embodiments, track 16 could have an oval configuration, or still another. As will be further apparent from the following description, track rollers 30, which may be identical and are hereinafter referred to in the singular, are uniquely configured for a simplified construction and simplified assembly while still providing sufficient or superior lubrication to seals and internal bearing surfaces in comparison with conventional strategies.

Figure 2:
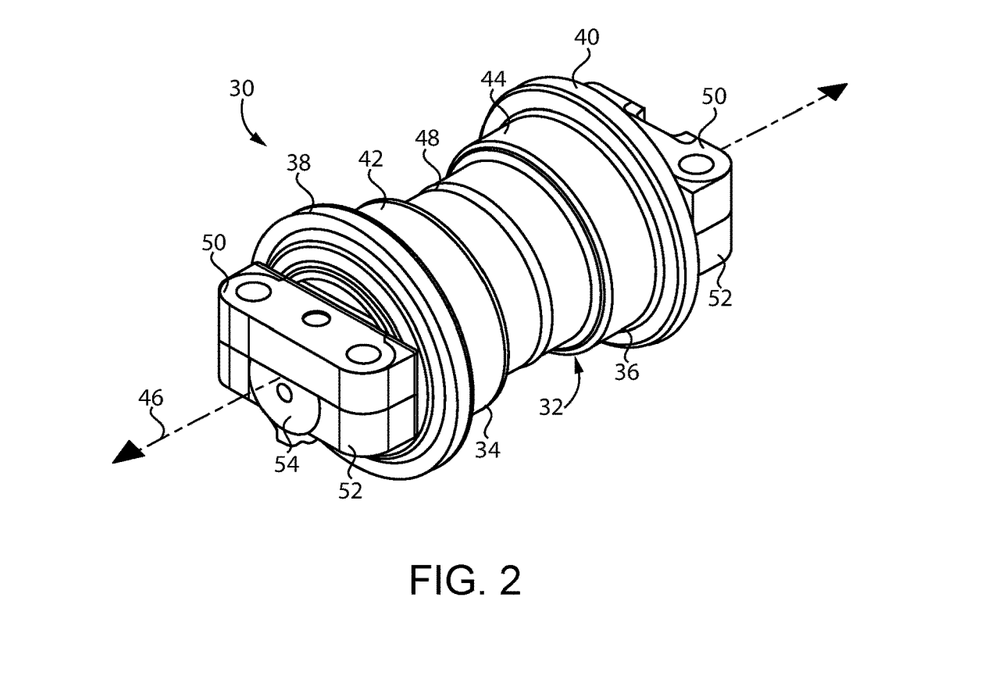
FIG. 2 is an isometric view of a track roller, according to one embodiment.

Referring also now to FIG. 2, there are shown additional features of track roller 30. Track roller 30 includes a roller shell 32 formed by a first half shell 34 and a second half shell 36 attached by way of a weld joint 48 in the illustrated embodiment. Roller shell 32 further includes an outer tread surface formed by a first outer tread surface 42 of first half shell 34 and a second outer tread surface 44 of second half shell 36. Outer tread surfaces 42 and 44 could be understood as parts of one outer tread surface, typically separated by a centrally located transition surface, and are structured to roll in contact with rail surfaces of track links in track 16 in a generally conventional manner. Outer tread surfaces 42 and 44 extend circumferentially around a roller axis of rotation 46. Roller shell 32 may further include a first radially projecting flange 38 of first half shell 34 adjacent to first outer tread surface 42, and a second radially projecting flange 40 of second half shell 36, adjacent to second outer tread surface 44. Flanges 38 and 40 assist in guiding track 16 therebetween during operation. A roller shaft 54 extends through roller shell 32 and supports roller shell 32 for rotation during service. Track roller 30 may be mounted to track roller frame 24 by way of a variety of strategies, and in the illustrated embodiment includes two upper clamping elements 50 and two lower clamping elements 52 that are clamped about roller shaft 54 and bolted to track roller frame 24.

Figure 3:
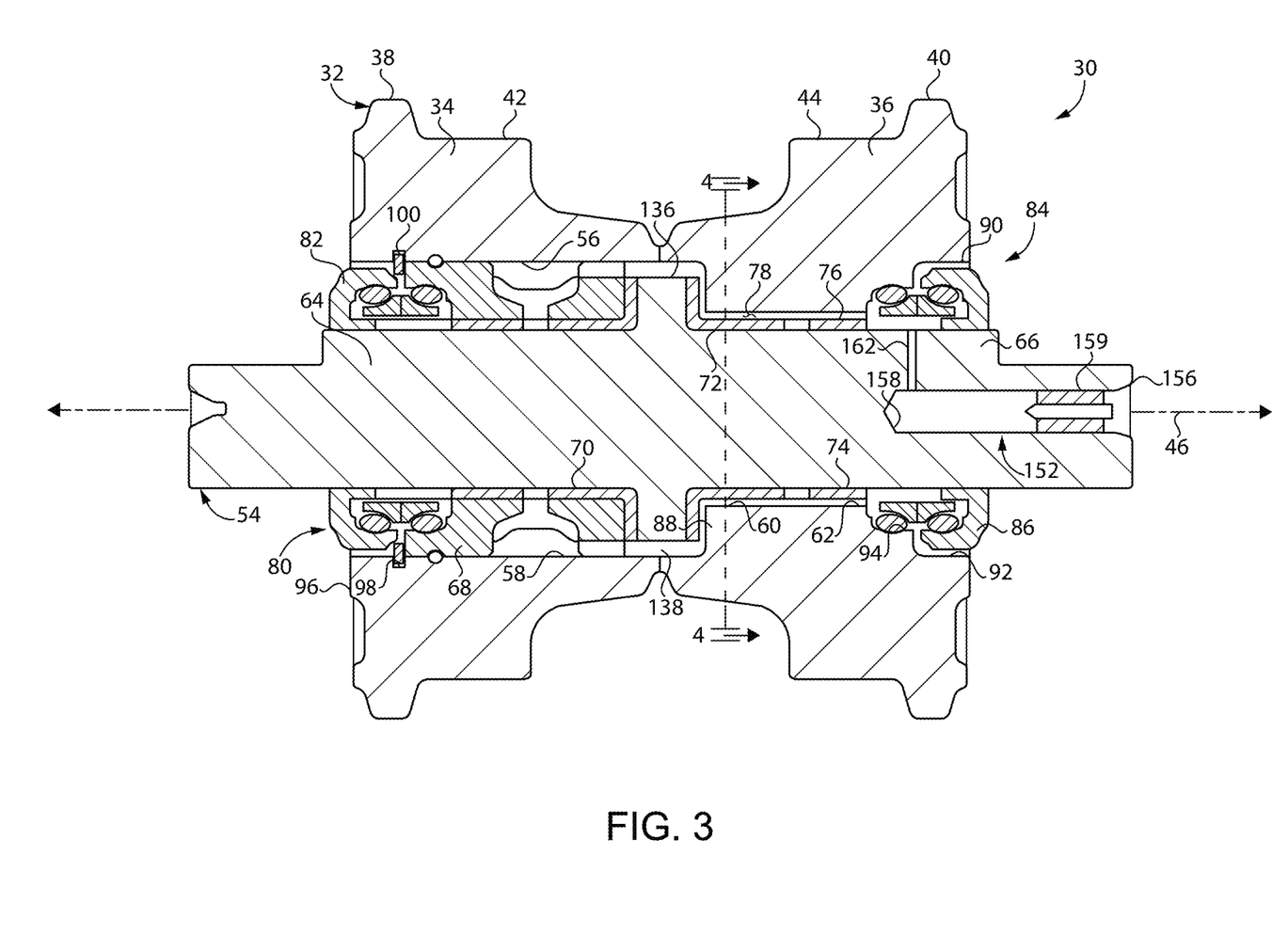
FIG. 3 is a sectioned diagrammatic view of a track roller, according to one embodiment.

Referring also now to FIG. 3, roller shell 32 includes a first inner surface 56 formed by first half shell 34 and forming a larger diameter shaft bore 58. Roller shell 32 also includes a second inner surface 34 formed by second half shell 36 and forming a smaller diameter shaft bore 62 coaxially arranged with larger diameter shaft bore 58. It can be seen from FIG. 3 that the different relative shaft bore sizes and certain other features of roller shell 32 are asymmetric between first half shell 34 and second half shell 36, enabling track roller 30 to be constructed with fewer components than many symmetrical track roller designs. The asymmetric design can also present certain challenges and opportunities respecting the storage, transfer, and circulation of lubricating oil, as further discussed herein. Roller shaft 54 includes a first shaft end 64 positioned within larger diameter shaft bore 58 and a second shaft end 66 positioned within smaller diameter shaft bore 62. A bushing 68 is positioned within larger diameter shaft bore 58. No bushing is within smaller diameter shaft bore 62. A first sleeve bearing 70 is rotatable about first shaft end 64 and positioned within bushing 68, thus within larger diameter shaft bore 58. In some embodiments, first sleeve bearing 70 can be interference-fitted with bushing 68. A second sleeve bearing 72 is rotatable about second shaft end 66 and positioned within roller shell 32, namely, within second half shell 36, within smaller diameter shaft bore 62. Second sleeve bearing 72 includes an inner bearing surface 74 and an outer bearing surface 76. In some embodiments, second sleeve bearing 72 may be interference-fitted with second half shell 36. The term "half" is used herein to refer to the two separate parts of roller shell 32 that may be used but should not be taken to require that each respective half shell 34 and 36 comprises precisely one half of roller shell 32.

Each of first sleeve bearing 70 and second sleeve bearing 72 may be a flanged bearing with a radially projecting portion forming a thrust flange. In other embodiments, separate sleeve bearing and thrust bearing components could be used. Second sleeve bearing 72 includes an inner bearing surface 74 and an outer bearing surface 76, and an axially extending oil passage 78 is formed by second inner surface 60 of roller shell 32 and outer bearing surface 76 of second sleeve bearing 72.

Track roller 30 further includes a first face seal assembly 80 interference-fitted upon first shaft end 64 and a second face seal assembly 84 interference-fitted upon second shaft end 66. Each of first face seal assembly 80 and second face seal assembly 84 may include a metal face seal assembly including metal sealing rings and non-metallic elastically deformable sealing elements or "torics" of known construction. First face seal assembly 80 and second face seal assembly 84 include a first seal carrier 82 and a second seal carrier 86, respectively. The interference-fits supporting first face seal assembly 80 and second face seal assembly 84 upon roller shaft 54 may be formed by first seal carrier 82 and second seal carrier 86 with roller shaft 54. Interference-fitting of first seal carrier 82 and second seal carrier 86 in this manner can maintain first face seal assembly 80 and second face seal assembly 84 in axial compression. As used herein the term "axial" and like indicators refers to a direction along an axis, in the present case roller axis of rotation 46.

Figure 4:
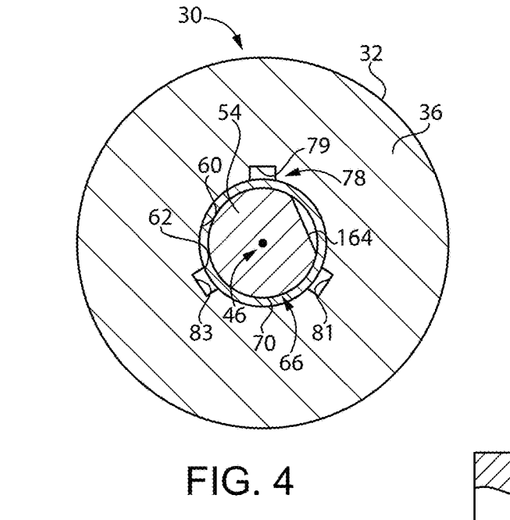
FIG. 4 is a sectioned view taken along line 4-4 of FIG. 3.

Referring also now to FIG. 4, there is shown a sectioned view taken along line 4-4 of FIG. 3. It will be recalled axially extending oil passage 78 is formed by second inner surface 60 and outer bearing surface 76. In the illustrated embodiment, oil passage 78 is formed by an oil groove 79 in second inner surface 60. Axially extending oil passage 78 may be one of a plurality of axially extending oil passages formed by a plurality of axially extending oil grooves 79, 81, and 83 in second inner surface 60. A total of three oil passages are formed by a total of three oil grooves 79, 81, and 83, and are arranged in a radially symmetric pattern about roller axis of rotation 46 in the illustrated embodiment.

Returning focus to FIG. 3, roller shell 32 may further include an inside thrust face or surface 88 and an outside seal recess 90 having a stepped-in profile. The profile can be understood as stepped-in in the sense that the diameter of seal recess 90 is reduced in a stepwise manner in an axially inward direction. Seal recess 90 can further be understood as formed by an outer bore 92 having a larger diameter, and an inner bore 94 having a smaller diameter. Second face seal assembly 84 is received at least partially within seal recess 90. Seal recess 90 may be circumferentially uniform about roller axis of rotation 46. It can also be seen from FIG. 3 that first half shell 34 includes an outside axial end surface 96. Larger diameter shaft bore 58 may originate within second half shell 36 at inside thrust surface 88, and terminate within first half shell 34 at outside axial end surface 96. A size of larger diameter shaft bore 58 at a location adjacent to thrust surface 88 may be the same as a size of larger diameter shaft bore 58 at a location adjacent to outside axial end surface 96. As noted above, second sleeve bearing 72 is within smaller diameter shaft bore 62. Outer bearing surface 76 may be in contact with second inner surface 60 so as to form, together with the plurality of oil grooves 79, 81, and 83, a plurality of axially extending oil passages as discussed above, which can convey oil to and from second face seal assembly 84 and a middle area or region of track roller 30 as further discussed herein. Axially extending oil passage 78 thus fluidly connects to the second face seal assembly 84. It can further be seen from FIG. 3 that a snap ring groove 98 is formed in first inner surface 56 and a snap ring 100 for retention of bushing 68 and reacting of thrust loads to or from bushing 68 is seated within snap ring groove 98. First inner surface 56 may be uninterrupted in circular profile between inside thrust surface 88 and snap ring groove 98, and uninterrupted in circular profile between outside axial end surface 96 and snap ring groove 98. Another way to understand these geometric attributes is that larger diameter shaft bore 58 may be uniformly cylindrical at substantially all axial locations except within snap ring groove 98. Within snap ring groove 98, larger diameter shaft bore 58 may also be cylindrical, but relatively enlarged in diameter.

Figure 5:
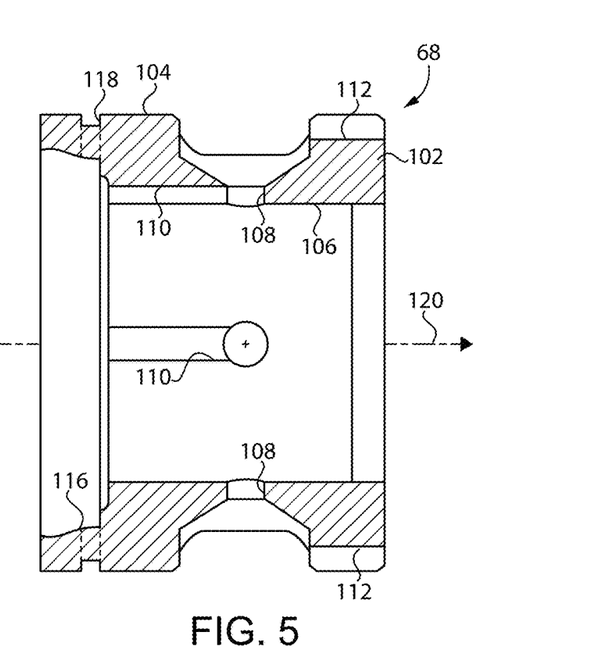
FIG. 5 is a sectioned diagrammatic view of a bushing for a track roller, according to one embodiment.
Figure 6:
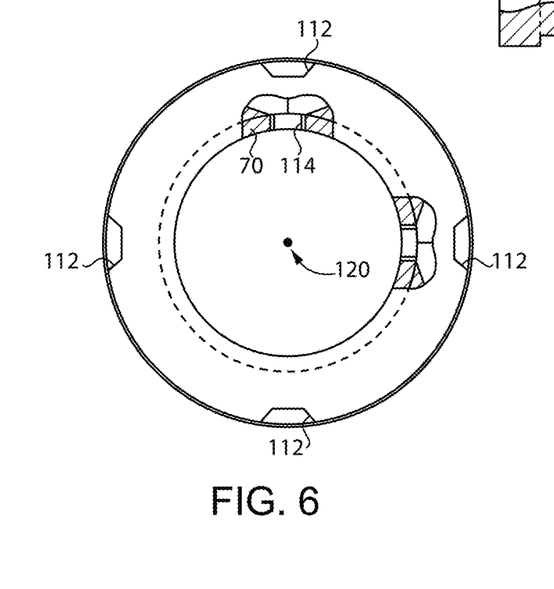
FIG. 6 is a partially sectioned end view of a bushing assembled with a sleeve bearing, according to one embodiment.

Referring also now to FIGS. 5 and 6 there are shown features of bushing 68 in further detail. Bushing 68 includes an annular bushing body 102 having an outer surface 104 and an inner surface 106 each extending circumferentially around a bushing axis 120. A plurality of outer grooves 112 may be formed in outer surface 104, and a plurality of inner grooves 110 formed in inner surface 106. A plurality of holes 108 are formed in bushing body 102 and fluidly connect between outer surface 104 and inner surface 106. Oil flow through outer grooves 112, holes 108, and inner grooves 110 can pass to or from first face seal assembly 80 and a middle area or region of track roller 30. A seal seating surface 116 interfaces with an elastically deformable sealing element of first face seal assembly 80. An outer O-ring groove 118 extends circumferentially around bushing body 102 at a location that is axially aligned with seal seating surface 116 in the illustrated embodiment.

Figure 7:
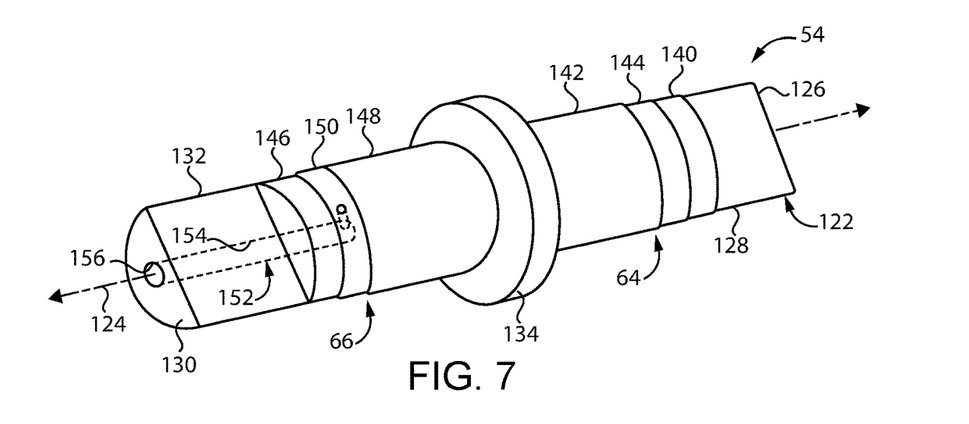
FIG. 7 is a diagrammatic view of a roller shaft, according to one embodiment.
Figure 8:
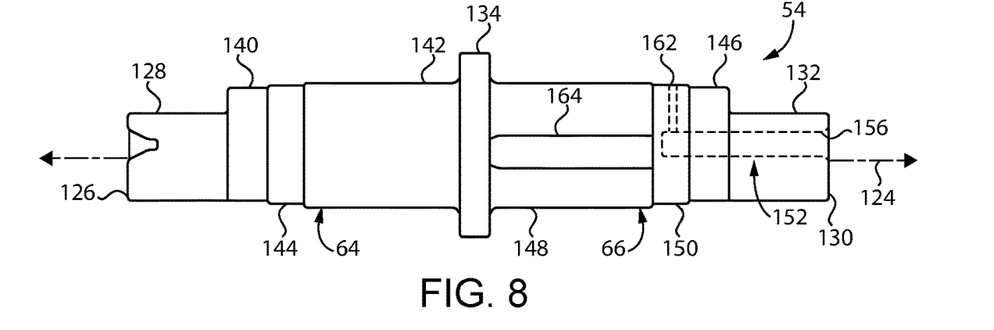
FIG. 8 is another diagrammatic view of a roller shaft as in FIG. 7.

Referring also now to FIGS. 7 and 8, there are shown features of roller shaft 54 in further detail. Roller shaft 54 includes an elongate shaft body 122 defining a longitudinal axis 124 and including a first shaft end 64 and a second shaft end 66 as noted above. First shaft end 64 includes a first axial end surface 126 facing a first axially outward direction and second shaft end 66 includes a second axial end surface 130 facing a second axially outward direction opposite to the first axially outward direction. First shaft end 64 further includes a first planar roller mounting surface 128 extending axially inward from first axial end surface 126, and second shaft end includes a second planar roller mounting surface 132 extending axially inward from second axial end surface 130. Roller mounting surfaces 128 and 132 interface with surfaces of clamping elements 50 and 52 to lock roller shaft 54 against rotation when installed for service in undercarriage system 14. Roller shaft 54 and elongate shaft body 122 further include a centrally located thrust flange 134 between first shaft end 64 and second shaft end 66. First shaft end 64 may be understood as the portion of elongate shaft body 122 upon a first side of thrust flange 134 and second shaft end 66 understood as a portion of elongate shaft body 122 upon an opposite side of thrust flange 134. As can be seen from FIG. 3, when track roller 30 is assembled thrust flange 134 is trapped between bushing 68 and inside thrust surface 88 and reacts thrust loads along roller axis of rotation 46 and longitudinal axis 124 during service, in cooperation with flanged portions of first sleeve bearing 70 and second sleeve bearing 72.

As also noted above, lubricating oil flows between a middle area or region of track roller 30 and first and second face seal assemblies 80 and 84. Roller shaft 54 and elongate shaft body 122 include thrust flange 134 which forms a wetted wall 136 of an oil cavity 138 in track roller 30. The axially extending oil passages formed by grooves 79, 81, and 83, and oil passages formed by grooves 112 and 110 in bushing 68, fluidly connect oil cavity 138 to second face seal assembly 84 and first face seal assembly 80, respectively. Roller shaft 54 and elongate shaft body 122 may further include an axially extending flat 164 upon second shaft end 66 originating at thrust flange 134 and terminating at a location that is axially outward of second sleeve bearing 72. Focusing briefly on FIG. 4, there can be seen flat 164 in the sectioned view. It will be appreciated that flat 164, which may include a milled or otherwise machined flat or relatively flat surface upon an otherwise cylindrical outer surface of roller shaft 54, contains and distributes lubricating oil to interfacing surfaces of roller shaft 54 and second sleeve bearing 72 as second sleeve bearing 72 rotates about roller shaft 54. Flat 164 is thus a physical structure of roller shaft 54 and might or might not be exactly planar but will be relatively planar in comparison to non-planar surfaces of roller shaft 54.

First shaft end 64 may further include a first seal carrier surface 140 adjacent to first planar roller mounting surface 128, and a first inboard surface extending between thrust flange 134 and first seal carrier surface 140. The first inboard surface can include an axially inward portion identified with the lead line of reference numeral 142, and an axially outward portion 144 directly adjacent to first seal carrier surface 140. Second shaft end 66 further includes a second seal carrier surface 146 adjacent to second planar roller mounting surface 132, and a second inboard surface extending between thrust flange 134 and second seal carrier surface 146. The second inboard surface can include two parts including an axially inward portion identified with the lead line for reference numeral 148, and an axially outward portion 150 directly adjacent to second seal carrier surface 146. In some embodiments surfaces 150 may be necked down, meaning reduced in diameter, relative to other portions of the respective first and second inboard surfaces 142 and 148. Each of first seal carrier surface 140 and second seal carrier surface 146 may be uninterrupted in circular profile. It will be recalled first seal carrier 82 and second seal carrier 86 may be interference-fitted upon roller shaft 54. The uninterrupted circular profiles of first and second seal carrier surfaces 140 and 146 assist in achieving a desired quality, strength and sealing of the interference fits. Each of first seal carrier surface 140 and second seal carrier surface 146 may also be necked-down relative to first inboard surface 142 and second inboard surface 148, respectively.

It will also be recalled oil reservoir 152 formed in elongate shaft body 122 may be confined in its extent to second shaft end 66. It should be appreciated that the terms "first" and "second" are used herein merely for descriptive convenience, and depending upon perspective a part of the apparatus described might be considered a first part or a second part. Confined in its extent means that oil reservoir 152 is entirely within one of the ends of roller shaft 54. Certain known roller shafts required long bore holes for lubricating oil storage and/or distribution. According to the present disclosure, oil reservoir 152 is simplified and only within a relatively small portion of roller shaft 54. In the illustrated embodiment oil reservoir 152 includes an axially extending main hole 154 extending inwardly from a fill opening 156 to a main hole end 158. A removable and non-metallic plug 159 as shown in FIG. 3 may be installed through fill opening 156 to contain lubricating oil within oil reservoir 152. Main hole end 158 may be a blind end or a dead end, and oil reservoir 152 may further include a radially extending cross-hole 160 extending from main hole 154 to an oil feed opening 162. Roller shaft 54 may include a total of one oil feed opening, and oil feed opening 162 may be formed in second inboard surface 148, namely, the axially outward portion 150 of inboard surface 148. The described arrangement locates oil feed opening 162 axially inward of seal carrier surface 140. When roller shaft 54 is assembled with roller shell 32 oil feed opening 162 will be axially outward of the corresponding first sleeve bearing 70 or second sleeve bearing 72, depending upon which of first shaft end 64 or 66 includes oil reservoir 152.

Figure 9:
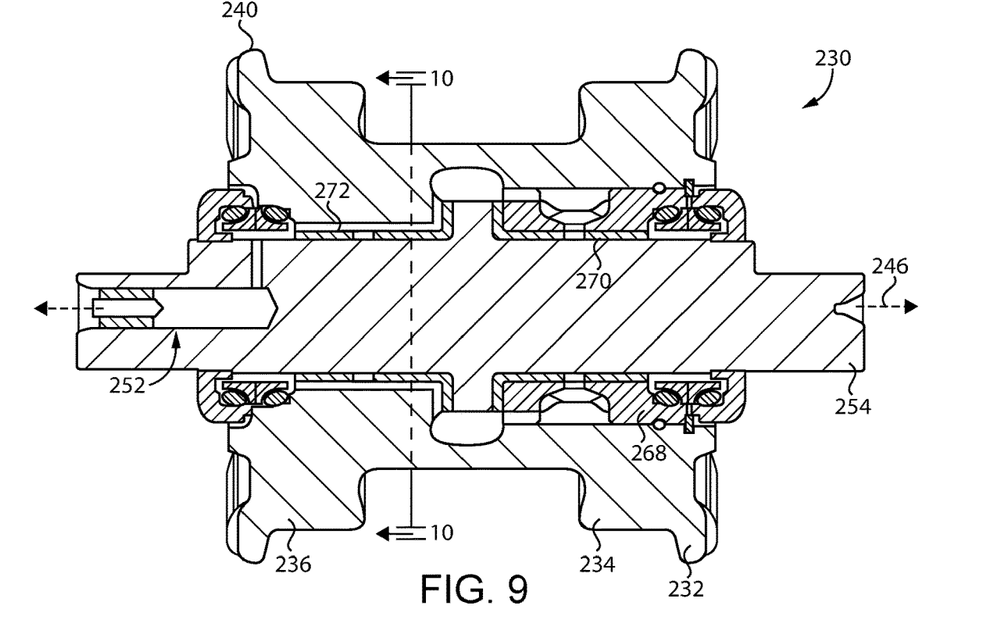
FIG. 9 is a sectioned diagrammatic view of a track roller, according to another embodiment.
Figure 10:
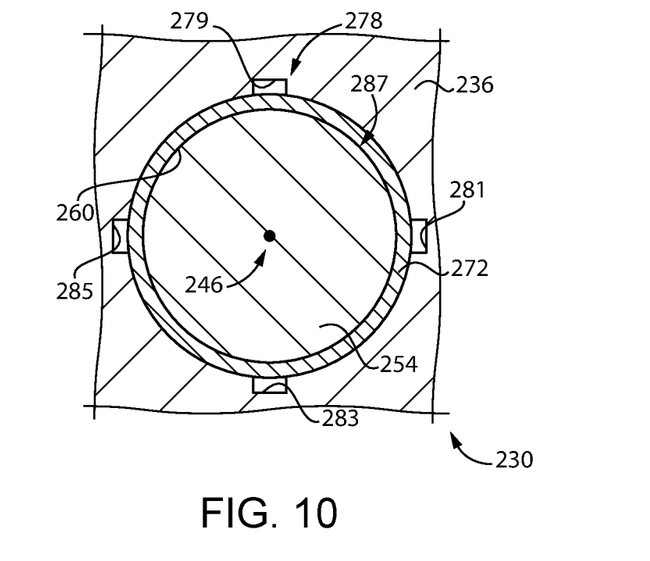
FIG. 10 is a sectioned view taken along line 10-10 of FIG. 9.

Referring now to FIGS. 9 and 10, there is shown a track roller 230 according to another embodiment. Track roller 230 includes a roller shell 232 having a first half shell 234 and a second half shell 236. First half shell 234 and second half shell 236 may be substantially identical to first half shell 34 and second half shell 36 discussed above. It should also be appreciated that discussion or description herein of any one embodiment can be understood to refer by way of analogy to any other embodiment except where otherwise indicated or apparent from the context. Track roller 230 further includes a roller shaft 254, a first sleeve bearing 270, a bushing 268, and a second sleeve bearing 272. An oil reservoir 252 is formed in roller shaft 254. It will be noted that oil reservoir 252 can be understood to be within second half shell 236. Analogous to foregoing embodiments, second half shell 236 forms a smaller or reduced shaft-bore-diameter part of roller shell 232. In other embodiments the arrangement might be flipped and the side of a track roller forming a larger diameter shaft bore could be associated with the side or end of a roller shaft having an oil reservoir formed therein. FIG. 10 shows a sectioned view taken along line 10-10 of FIG. 9. In track roller 230, a total of four axially extending oil passages formed by axially extending oil grooves 279, 281, 283, and 285 are provided. The respective grooves are formed in an inner surface 260 of second half shell 236. The four oil passages formed by the respective grooves in inner surface 260 are arranged in a radially symmetric pattern about a roller axis of rotation 246. It can also be seen from FIG. 10 that roller shaft 254 includes an outer shaft surface 287 uninterrupted in circular profile within second sleeve bearing 272. The arrangement contrasts with the configuration of roller shaft 54 wherein flat 164 is provided to distribute oil.

Figure 11:
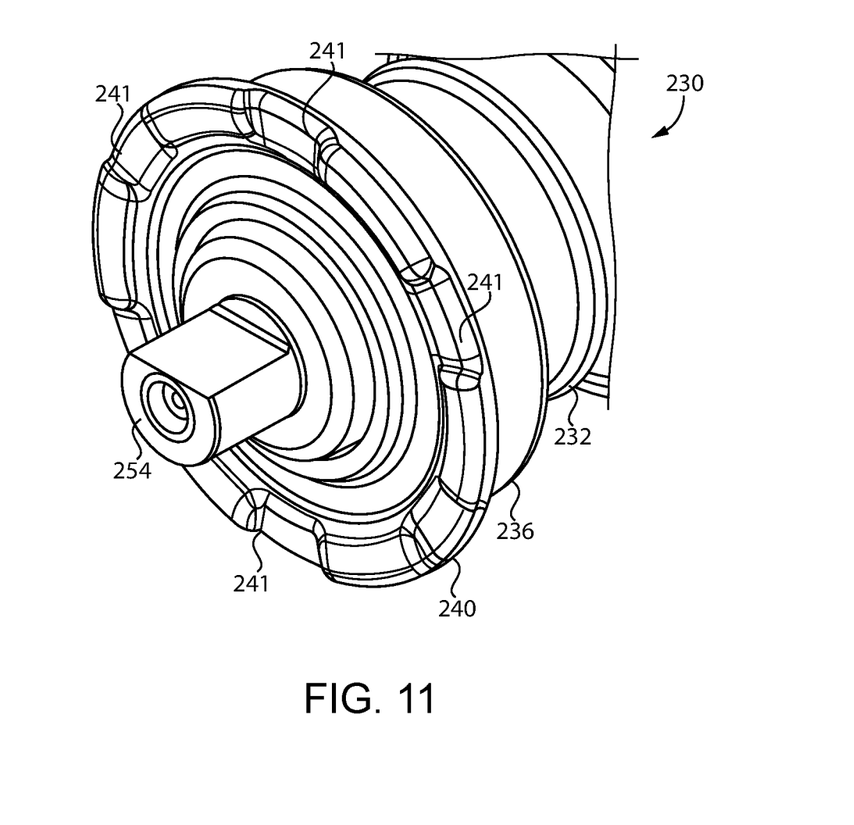
FIG. 11 is a diagrammatic view of a track roller as in FIG. 10.

Referring now to FIG. 11, there is shown another view of track roller 230 showing portions of second half shell 236. Second half shell 236 includes radially projecting flange 240. Radially projecting flange 240 may be one of a first radially projecting end flange and a second radially projecting end flange. At least one of flange 240, or a second radially projecting end flange, may have formed therein a plurality of weight-reduction scallops 241. Scallops 241 can be understood to extend axially inward into flange 240 to reduce an amount of material that might otherwise be required, and thereby limit a weight of track roller 230. As noted, weight-reduction scallops might also be provided in another end flange in track roller 230, as well as in flanges of any of the other track roller embodiments contemplated herein.

INDUSTRIAL APPLICABILITY

Referring to the drawings generally, but returning focus to the embodiment of FIGS. 3-8, during service in undercarriage system 14 roller shell 32 will rotate with first sleeve bearing 70, bushing 68, and second sleeve bearing 72, about roller shaft 54. Lubricating oil is contained in oil reservoir 152, and the various passages and cavities between first face seal assembly 80 and second face seal assembly 84. Reacting of thrust loads, and rotation of roller shell 32 can assist in distributing lubricating oil to the various interfacing surfaces and to or from first face seal assembly 80 and second face seal assembly 84. The flow of lubricating oil is believed to not only slow down wear between components but also assist in dissipating heat. In contrast to prior designs employing more complex or difficult to manufacture lubrication strategies the present disclosure is contemplated to provide such capabilities with a reduced number of parts and simplified assembly process.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track roller for a ground-engaging track system comprising:
   a roller shell including an outer tread surface extending circumferentially around a roller axis of rotation, a first inner surface forming a larger diameter shaft bore, and a second inner surface forming a smaller diameter shaft bore coaxially arranged with the larger diameter shaft bore;
   a roller shaft including a first shaft end positioned within the larger diameter shaft bore, and a second shaft end positioned within the smaller diameter shaft bore;
   a bushing positioned within the larger diameter shaft bore;
   a first sleeve bearing rotatable about the first shaft end and positioned within the bushing;

a second sleeve bearing rotatable about the second shaft end and positioned within the roller shell, the second sleeve bearing including an inner bearing surface and an outer bearing surface; and an axially extending oil passage formed by the second inner surface of the roller shell and the outer bearing surface of the second sleeve bearing.

2. The track roller of claim 1 further comprising a first face seal assembly interference-fitted upon the first shaft end and a second face seal assembly interference-fitted upon the second shaft end.

3. The track roller of claim 2 wherein the axially extending oil passage is one of a plurality of axially extending oil passages formed by grooves in the second inner surface.

4. The track roller of claim 3 wherein the roller shaft includes a thrust flange forming a wetted wall of an oil cavity in the track roller, and the plurality of axially extending oil passages fluidly connect the oil cavity to the second face seal assembly.

5. The track roller of claim 4 wherein the plurality of axially extending oil passages includes a total of three oil passages arranged in a radially symmetric pattern about the roller axis of rotation.

6. The track roller of claim 5 wherein the roller shaft includes an axially extending flat upon the second shaft end originating at the thrust flange and terminating at a location that is axially outward of the second sleeve bearing.

7. The track roller of claim 4 wherein:
the plurality of axially extending oil passages includes a total of four oil passages formed by grooves in the second inner surface and arranged in a radially symmetric pattern about the roller axis of rotation; and
the second shaft end includes an outer shaft surface uninterrupted in circular profile within the second sleeve bearing.

8. The track roller of claim 1 wherein the roller shaft includes an oil reservoir formed therein, and the oil reservoir is confined in its extent to one of the first shaft end or the second shaft end.

9. The track roller of claim 8 wherein the oil reservoir includes an axially extending main hole extending inwardly from a fill opening to a main hole end, and a radially extending cross-hole extending from the main hole to an oil feed opening located axially outward of the corresponding one of the first sleeve bearing or second sleeve bearing.

10. The track roller of claim 1 wherein the roller shell includes a first radially projecting end flange and a second radially projecting end flange, and at least one of the first radially projecting end flange or the second radially projecting end flange has formed therein a plurality of weight-reduction scallops.

11. A roller for an undercarriage system comprising:
a roller shell including a first radially projecting flange, a first outer tread surface adjacent to the first radially projecting flange and extending circumferentially around a roller axis of rotation, and a first inner surface forming a larger diameter shaft bore;
the roller shell further including a second radially projecting flange, a second outer tread surface adjacent to the second radially projecting flange and extending circumferentially around the roller axis of rotation, and a second inner surface forming a smaller diameter shaft bore coaxially arranged with the larger diameter shaft bore;
the roller shell further including an inside thrust surface and an outside seal recess having a stepped-in profile, and the smaller diameter shaft bore extending between the inside thrust surface and the outside seal recess; and
a plurality of oil grooves each formed in the second inner surface and extending from the inside thrust surface to the seal recess.

12. The roller of claim 11 wherein the roller shell includes a first half shell that includes the first inner surface, a second half shell that includes the second inner surface, and a weld joint attaching the first half shell to the second half shell.

13. The roller of claim 12 wherein:
the first half shell includes an outside axial end surface;
the larger diameter shaft bore originates within the second half shell at the inside thrust surface, and terminates within the first half shell at the outside axial end surface; and
a size of the larger diameter shaft bore at a location adjacent to the inside thrust surface is the same as a size of the larger diameter shaft bore at a location adjacent to the outside axial end surface.

14. The roller of claim 12 wherein the plurality of oil grooves includes a total of three oil grooves arranged in a radially symmetric pattern about the roller axis of rotation.

15. The roller of claim 12 further comprising a snap ring groove formed in the first inner surface, and the first inner surface is uninterrupted in circular profile between the inside thrust surface and the snap ring groove, and between the outside axial end surface and the snap ring groove.

16. The roller of claim 11 further comprising a sleeve bearing within the smaller diameter shaft bore and including an outer bearing surface in contact with the second inner surface so as to form, together with the plurality of oil grooves, a plurality of axially extending oil passages.

17. A roller shaft for a track roller in an undercarriage system comprising:
an elongate shaft body defining a longitudinal axis and including a first shaft end having a first axial end surface and a first planar roller mounting surface extending inwardly from the first axial end surface, a second shaft end having a second axial end surface and a second planar roller mounting surface extending inwardly from the second axial end surface, and a thrust flange between the first shaft end and the second shaft end;
the first shaft end further including a first seal carrier surface adjacent to the first planar roller mounting surface, and a first inboard surface extending between the thrust flange and the first seal carrier surface;
the second shaft end further including a second seal carrier surface adjacent to the second planar roller mounting surface, and a second inboard surface extending between the thrust flange and the second seal carrier surface; and
an oil reservoir is formed in the elongate shaft body, and the oil reservoir is confined in extent to the second shaft end.

18. The roller shaft of claim 17 wherein each of the first seal carrier surface and the second seal carrier surface is uninterrupted in circular profile, and necked-down relative to the first inboard surface and the second inboard surface, respectively.

19. The roller shaft of claim 18 wherein the oil reservoir includes an axially extending main hole extending inwardly from a fill opening to a main hole end, and a radially extending cross-hole extending from the main hole to an oil feed opening.

20. The roller shaft of claim 19 wherein the roller shaft includes a total of one oil feed opening, and the oil feed opening is formed in the second inboard surface.

\* \* \* \* \*